(12) United States Patent
Kikuchi et al.

(10) Patent No.: US 7,208,444 B2
(45) Date of Patent: Apr. 24, 2007

(54) EXHAUST GAS PURIFYING CATALYST AND METHOD OF PRODUCING SAME

(75) Inventors: Hiroto Kikuchi, Kanagawa (JP); Tsuguhiro Ohnuma, Tokyo (JP); Motohisa Kamijo, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/090,248

(22) Filed: Mar. 28, 2005

(65) Prior Publication Data

US 2005/0170958 A1    Aug. 4, 2005

Related U.S. Application Data

(62) Division of application No. 09/794,010, filed on Feb. 28, 2001, now abandoned.

(30) Foreign Application Priority Data

Feb. 28, 2000    (JP)    ................ 2000-050993

(51) Int. Cl.
    *B01J 23/00*    (2006.01)
(52) U.S. Cl. ............... 502/300; 502/327; 502/333; 502/339; 502/415; 502/439; 502/355
(58) Field of Classification Search ............... 502/300, 502/327, 333, 339, 415, 439, 355
    See application file for complete search history.

(56) References Cited

U.S. PATENT DOCUMENTS

| 3,513,109 | A | * | 5/1970 | Stiles ..................... 502/241 |
|---|---|---|---|---|
| 4,056,489 | A | * | 11/1977 | Hindin et al. ............... 502/257 |
| 4,134,860 | A | | 1/1979 | Hindin et al. |
| 4,261,862 | A | * | 4/1981 | Kinoshita et al. ............ 502/304 |
| 4,451,517 | A | | 5/1984 | Inoguchi et al. |
| 4,532,228 | A | | 7/1985 | Golino et al. |
| 4,806,519 | A | | 2/1989 | Chiba et al. |
| 4,843,056 | A | * | 6/1989 | Matsumoto et al. ........ 502/302 |
| 5,039,647 | A | | 8/1991 | Ihara et al. |
| 5,063,192 | A | | 11/1991 | Murakami et al. |
| 5,208,206 | A | | 5/1993 | Yasaki et al. |
| 5,439,865 | A | | 8/1995 | Abe et al. |
| 5,795,840 | A | * | 8/1998 | Takami et al. ............... 502/327 |
| 5,981,427 | A | * | 11/1999 | Sung et al. .................. 502/325 |
| 6,375,910 | B1 | * | 4/2002 | Deeba et al. ............. 423/239.1 |
| 6,500,392 | B2 | * | 12/2002 | Mizuno et al. ............. 422/177 |

FOREIGN PATENT DOCUMENTS

JP    53-135898    11/1978

(Continued)

*Primary Examiner*—Cam N. Nguyen
(74) *Attorney, Agent, or Firm*—Foley & Lardner LLP

(57) ABSTRACT

An exhaust gas purifying catalyst for purifying exhaust gas discharged from an internal combustion engine of an automotive vehicle. The exhaust gas purifying catalyst comprises a substrate on which a catalytic coat layer containing a catalyst component is formed. The catalytic coat layer is formed by coating a slurry containing the catalyst component on a surface of the substrate. A crack-preventing coat layer is formed on an upper-most surface of the catalytic coat layer. The crack-preventing coat layer has a thickness of not larger than 50 μm.

5 Claims, 6 Drawing Sheets

FOREIGN PATENT DOCUMENTS

| | | |
|---|---|---|
| JP | 58-122044 A | 7/1983 |
| JP | 62-149339 A | 7/1987 |
| JP | 4-48931 A | 2/1992 |
| JP | 05-285386 A | 11/1993 |
| JP | 7-178343 A | 7/1995 |

* cited by examiner

EXHAUST GAS PURIFYING CATALYST AND METHOD OF PRODUCING SAME

The present application is a divisional of U.S. application Ser. No. 09/794,010, filed Feb. 28, 2001 now abandoned, the entire contents of which are incorporated herein by reference.

BACKGROUND OF THE INVENTION

This invention relates to improvements in an exhaust gas purifying catalyst for purifying exhaust gas discharged from an internal combustion engine of an automotive vehicle or the like so as to remove HC (hydrocarbons), CO (carbon monoxide) and NOx (nitrogen oxides) from exhaust gas and to a method of producing the exhaust gas purifying catalyst, and more particularly to the exhaust gas purifying catalyst arranged to prevent a catalytic coat layer from being cracked thereby protecting the catalytic coat layer from being peeled off from a substrate such as a ceramic monolithic substrate or a metallic honeycomb-type substrate and to the producing method of such exhaust gas purifying catalyst.

A variety of methods of producing exhaust gas purifying catalysts have been proposed and put into practical use, in which a catalytic coat layer is formed on a monolithic substrate such as a ceramic monolithic substrate or a metallic honeycomb-type substrate. One of them is disclosed in Japanese Patent Provisional Publication No. 53-135898, in which a compound including alumina and ceria carrying noble metals is mixed with an acetic acid aqueous solution and pulverized to form a catalytic slurry. The catalytic slurry was coated on the ceramic monolithic substrate, followed by drying and firing. Another one is disclosed in Japanese Patent Provisional Publication No. 58-122044, in which activated alumina and lanthanum carbonate are added to an aqueous solution of aluminium nitrate, followed by stirring, mixing and pulverization, so as to form a slurry. This slurry is coated on a monolithic substrate, and then an excessive liquid is blown up with compressed air. Thereafter, the coated substrate is dried and fired so as to obtain a coated monolithic substrate. The coated monolithic substrate is dipped in a solution of noble metal(s), followed by drying and firing. A further one is disposed in Japanese Patent Provisional Publication No. 5-285386, in which powder materials such as alumina, cerium and zirconium oxide carrying noble metals are pulverized by a ball mill or the like thereby forming an aqueous slurry. This slurry was coated on a substrate such as a honeycomb-type monolithic substrate.

Now, automotive vehicles have been recently being improved in durability and therefore have become long in usage duration and increased in chance of cruising on freeways with development of freeways. This has required further improvements in durability in exhaust gas purifying catalysts for automotive vehicles.

SUMMARY OF THE INVENTION

However, in the above conventional producing methods of exhaust gas purifying catalysts, the catalytic slurry largely contracts owing to evaporation of water content at drying and firing steps for fixing the coated catalytic slurry, and therefore a catalytic coat layer formed of the catalytic slurry cannot be endurable to tension generated in the catalytic coat layer. As a result, cracks or crazes are produced in the catalytic coat layer formed on the monolithic substrate after firing (at a stage where the coated monolithic substrate is formed, in the producing method of Japanese Patent Provisional Publication No. 58-122044). The cracks in the catalytic coat layer may cause the catalytic coat layer to be peeled off from the monolithic substrate, thereby degrading the durability of the catalyst.

It is an object of the present invention to provide an improved exhaust gas purifying catalyst and a method of producing the same catalyst, which can effectively overcome drawbacks encountered in conventional exhaust gas purifying catalysts and conventional methods of producing the same catalysts.

Another object of the present invention is to provide an improved exhaust gas purifying catalyst and a method of producing the same catalyst, which can largely improve durability of exhaust gas purifying catalysts.

A further object of the present invention is to provide an improved exhaust gas purifying catalyst and a method of producing the same catalyst, which can effectively prevent cracks from being produced in a catalytic coat layer when the catalytic coat layer is formed on a substrate such as a ceramic monolithic substrate or a metallic honeycomb-type substrate, thereby protecting the catalytic coat layer from peeling off from the substrate.

An aspect of the present invention resides in an exhaust gas purifying catalyst comprising a substrate. A catalytic coat layer containing a catalyst component is formed on the substrate. The catalytic coat layer is formed by coating a slurry containing the catalyst component on a surface of the substrate. A crack-preventing coat layer is formed on an upper-most surface of the catalytic coat layer. The crack-preventing coat layer has a thickness of not larger than 50 μm.

Another aspect of the present invention resides in a method of producing an exhaust gas purifying catalyst. The method comprising (a) coating a substrate with a first slurry containing a catalytic component; (b) drying and firing the first slurry on the substrate to form a first catalytic coat layer on the substrate; (c) coating a second slurry containing a catalytic component, on an upper-most surface of the catalytic coat layer, the second slurry containing particle materials having an average particle size ranging from 3 to 7 μm; and (d) drying and firing the second slurry on the first catalytic coat layer to form a second catalytic coat layer having a thickness of not larger than 50 μm.

A further aspect of the present invention resides in a method of producing an exhaust gas purifying catalyst. The method comprising (a) preparing a slurry including a catalyst component and water which containing anion other than OH⁻ in a content of not larger than 50 ppm and cation other than H⁺ in a content of not larger than 50 ppm; (b) coating a substrate with the slurry; and (c) drying and firing the slurry on the substrate to form a catalytic coat layer on the substrate.

DETAILED DESCRIPTION OF THE INVENTION

Figure 1A:
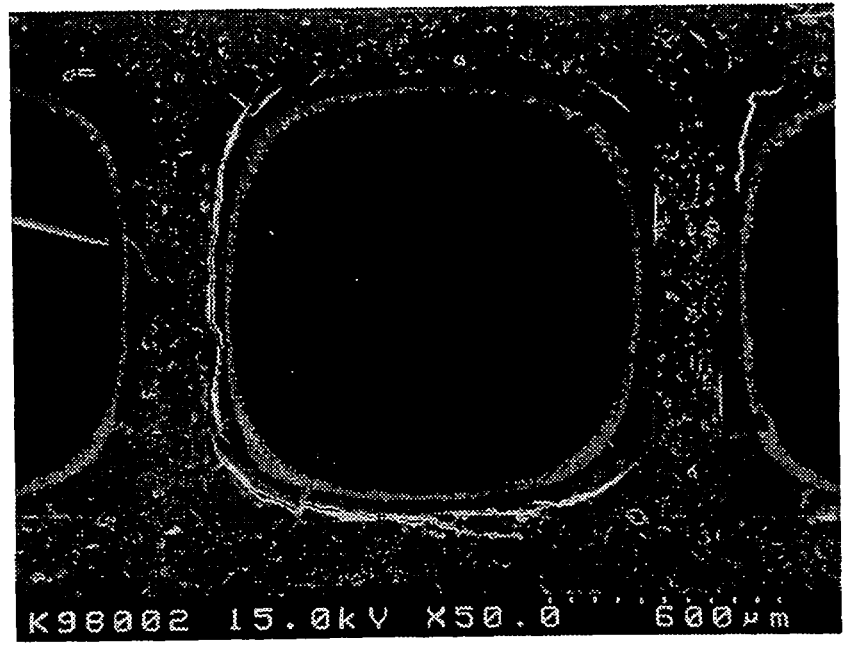
FIG. 1A is an electronmicrograph obtained by a scanning electron microscope (SEM), of a section of an example (Example 1) of an exhaust gas purifying catalyst according to the present invention.

According to the present invention, an exhaust gas purifying catalyst comprises a substrate on which a catalytic coat layer containing a catalyst component is formed. The catalytic coat layer is formed by coating a slurry containing the catalyst component on a surface of the substrate. A crack-preventing coat layer is formed on an upper-most surface of the catalytic coat layer. The crack-preventing coat layer has a thickness of not larger than 50 μm.

The slurry contains particle materials whose average particle size affects the density of a solid content in the slurry obtained after drying the slurry, in which the density of the coat layer decreases to increase the coefficient of contraction of the coat layer as the average particle size decreases. Accordingly, when the particle size of the particle materials of the slurry for the coat layer having the upper-most surface is large, the density of the solid content obtained after drying the slurry is low thereby decreasing the amount of shrinkage of the coat layer so that crack or craze is difficult to be formed in the catalytic coat layer. It is to be noted that no crack and craze due to shrinkage cannot be produced if the average particle size of the particle materials of the slurry is not smaller than 3 μm, taking account of the shape of a ceramic honeycomb-type monolithic substrate and a metallic monolithic substrate and various conditions of a drying step, for a practical exhaust gas purifying catalyst. However, if the average particle size of the particle materials of the slurry exceeds 7 μm, there are tendencies that cells of the monolithic substrate are clogged with the particle materials of the slurry during coating of the slurry, and the catalytic coat layer itself becomes brittle. Accordingly, it is preferable that the average particle size of particle materials of the slurry is within a range of from 3 to 7 μm. In this case, the average particle size was measured by a laser diffraction scattering method using a light source of semiconductor laser having a wavelength of 680 nm and an output power of 3 mW.

Additionally, when the thickness of the catalytic coat layer is reduced, the amount of shrinkage of the coat layer decreases so that tension generated in the coat layer is weakened, thereby suppressing production of crack and craze. In the presently used materials for the coat layer, crack due to shrinkage cannot be produced in the coat layer if the thickness of the coat layer upon firing is not larger than 50 μm.

In the exhaust gas purifying catalyst according to the present invention, the crack-preventing coat layer is formed as a finish or upper-most coat layer and has the thickness of not larger than 50 μm. Consequently, crack or craze cannot be produced in the crack-preventing coat layer. Even in case that crack is formed in the catalytic coat layer below the crack-preventing coat layer, the materials of the crack-preventing coat layer will cover or is filled in the crack thereby ensuring the strength of the catalytic coat layer, thus preventing the materials of the monolithic substrate from being separated from the monolithic substrate. It is to be noted that the crack-preventing coat layer may be so thin as not to be able to be recognized as a layer with naked eye, after firing thereof; however, the materials of the slurry is filled into the crack in the catalytic coat layer thereby ensuring the strength of the catalytic coat layer.

Any kind of catalyst components or metals may be contained in the materials of the slurry used for the crack-preventing coat layer. Accordingly, for example, even in case that a particular catalytic coat layer is required as the upper-most coat layer from the viewpoint of catalytic performance design, the upper-most coat layer can be formed as a crack-resistant structure layer containing necessary catalyst components, thereby ensuring freedom in catalyst design and sufficient strength of the particular catalytic coat layer.

In order to produce the exhaust gas purifying catalyst according to the present invention, a (catalytic) slurry containing particle materials having an average particle size ranging from 3 to 7 μm is coated at the upper-most surface of the catalytic coat layer in a condition in which the catalytic slurry is formed into a coat layer having a thickness of not larger than 50 μm upon firing. Accordingly, even if there is crack in the lower or catalytic coat layer, the catalytic slurry will cover or is filled into the crack in the lower coat layer, so that a high quality catalytic layer without crack or craze is formed upon drying and firing. This can provide the catalytic coat layer which is improved in strength and excellent in separation or peeling-resistance of the coat layer from the substrate.

The slurry for forming the crack-preventing coat layer preferably contains porous substance such as alumina and/or zeolite, or may contain α-alumina and/or titania which have relatively small surface area.

It is preferable that the content of each of anions other than hydroxide ion (OH⁻) and cations other than hydrogen ion (H⁺) in the slurry for forming the catalytic coat layer on the surface of the substrate is suppressed to a value of not larger than 50 ppm. Examples of the anions other than hydrogen ion (OH−) are nitrate ions ($NO_3^-$), chlorine ion ($Cl^-$), sulfate ion ($SO_4^{-2}$), acetate ion ($CH_3COO^-$) and the like. Examples of the cations other than hydrogen ion (H⁺) are aluminum ion ($Al^{+3}$), sodium ion ($Na^+$), magnesium ion ($Mg^{+2}$), calcium ion ($Ca^{+2}$) and the like.

In other words, in the catalytic slurry for forming the catalytic coat layer on the surface of the substrate, hydrogen ion, ions dissolved out from powder of the catalyst component(s) and ions contained in a liquid or solution used in the slurry are adsorbed to particles of alumina, of alumina carrying noble metal(s) in the slurry, of alumina compound, and of alumina compound carrying noble metal(s), thereby forming complex ion layers around the above-mentioned particles. In this connection, acetic acid is used in a catalyst production method as disclosed in Japanese Patent Provisional Publication No. 53-135898, and a large amount of nitrate ion is used in a catalyst production method as disclosed in Japanese Patent Provisional Publication No. 58-122044, in which complex ion layer containing acetate ion or nitrate ion is formed around alumina particle and/or the like. In case that a slurry provided with such complex ion layer is coated on the monolithic substrate so that the complex ion layer exists among particles in the catalytic coat layer, the ion layer is diminished during drying and firing of the catalytic coat layer so that particles are combined with each other. This reduces the volume of the catalytic coat layer thereby producing crack in the catalytic coat layer and/or a coat layer formed of alumina compound.

In contrast, according to the production method for the exhaust gas purifying catalyst according to the present invention, the content of ions other than hydroxide ion (OH⁻) and hydrogen ion (H⁺) in the catalytic slurry is suppressed as little as possible, so that thin ion layer is formed around alumina particle or the like. Consequently, ion layer is hardly formed among particles when the catalytic slurry is coated on the substrate, and therefore shrinkage of the catalytic coat layer cannot be produced during drying and during firing thereby preventing production of crack and craze in the catalytic coat layer. The reason why each of the content of the anions other than hydroxide ion (OH–) and the content of cations other than hydrogen ion (H+) is limited to the value of not larger than 50 ppm is that shrinkage of the catalytic coat layer becomes remarkable thereby making it impossible to sufficiently prevent production of crack or craze in the catalytic coat layer if the each content exceeds 50 ppm.

As apparent from the above, according to the present invention, the crack-preventing coat layer having the thickness of not larger than 50 μm is formed at the upper-most surface of the catalytic coat layer. Accordingly, no crack or craze can be produced in the crack-preventing coat layer thereby maintaining a sufficient strength of the catalytic coat layer so that the catalytic coat layer can be prevented from being separated or peeled off from the substrate, which is highly advantageous.

Additionally, in the production method for the exhaust gas purifying catalyst, the catalytic slurry containing particle materials having the average particle size ranging from 3 to 7 μm is coated at the upper-most surface of the catalytic coat layer in the condition in which the catalytic slurry is formed into a finish coat layer having a thickness of not larger than 50 μm upon firing. Accordingly, the high quality catalytic layer without crack or craze is formed upon drying and firing, which is also highly advantageous.

Furthermore, in the production method of the exhaust gas purifying catalyst, the content of each of anions other than hydroxide ion (OH⁻) and cations other than hydrogen ion (H⁺) in the slurry for forming the catalytic coat layer on the surface of the substrate is suppressed as small as possible. In other words, the catalytic slurry containing each of anions other than hydroxide ion (OH⁻) and cations other than hydrogen ion (H⁺) in an amount of not larger than 50 ppm is used. Accordingly, ion layer is hardly formed among particles when the catalytic slurry is coated on the substrate, and therefore shrinkage of the catalytic coat layer cannot be produced during drying and during firing thereby preventing production of crack and craze in the catalytic coat layer. This makes it possible to largely improve durability of the exhaust gas purifying catalyst, which is also highly advantageous.

EXAMPLES

The present invention will be more readily understood with reference to the following Examples in comparison with Comparative Examples; however, these Examples are intended to illustrate the invention and are not to be construed to limit the scope of the invention.

Example 1

First, a porcelain ball mill was charged with 500 g of MFI (zeolite), 100 g of silica sol and 1000 g of pure water, followed by mixing and pulverizing, thereby obtaining a slurry containing particle materials whose average particle size was 2.1 μm. This slurry was coated on a cordierite ceramic honeycomb-type monolithic substrate having a volume of 1.3 liters, 400 (axially extending) cells per square inch, an elliptic cross-section, a cross-sectional area of 113 cm² and a length of 115 mm, so that thin walls of cells were coated with the slurry. Thereafter, the coated monolithic substrate was blown with air stream to remove excessive slurry in the cells, and then dried and fired at 400° C. for 1 hour. As a result, a catalyst was prepared in which a catalytic or inner coat layer was formed on the wall of the cells of the monolithic substrate. The weight of the catalytic coat layer was 150 g per one liter of the monolithic substrate.

Next, an alumina powder was impregnated with an aqueous solution of palladium compound, followed by drying at 150° C. for 12 hours and then by firing at 400° C. for 1 hour, thereby preparing a Pd-carried alumina powder. Subsequently, a porcelain ball mill was charged with 1000 g of the Pd-carried alumina powder, 11 g of activated alumina and 1500 g of an aqueous solution of nitric acid, followed by mixing and pulverizing, thereby obtaining a slurry which contains particle materials whose average particle size was 4.6 μm. This slurry was coated on the above catalyst provided with the catalytic coat layer, so that the walls of the cells were coated with the slurry. Thereafter, the coated catalyst was blown with air stream to remove excessive slurry in the cells, and then dried and fired at 400° C. for 1 hour. As a result, a catalyst of Example 1 was prepared in which an outer coat layer was formed on the inner coat layer of the catalyst, in which the weight of the outer coat layer was 75 g per one liter of the monolithic substrate. The weight of total coat layers was 225 g per one liter of the monolithic substrate.

Figure 1B:
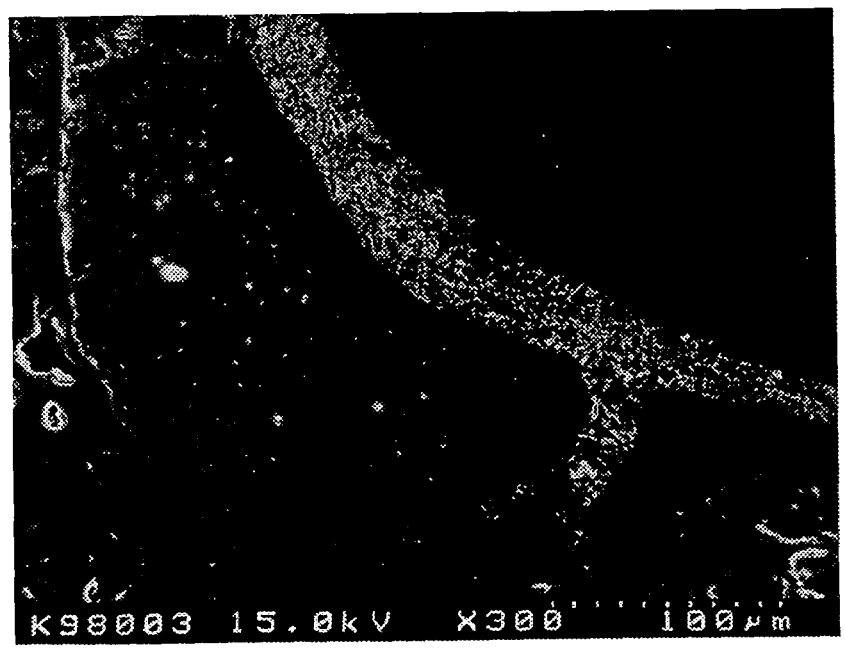
FIG. 1B is an enlarged electronmicrograph depicting a part of the section of FIG. 1A.

Table 1 shows results of measurement and observation of the catalyst of Example 1, including the thickness of the inner and outer coat layers and the presence or absence of crack in the catalyst. Additionally, FIGS. 1A and 1B show observation results (electronmicrographs at 50 and 300 magnifications) of the cross-sectional surface of the coat layers of the catalyst of Example 1. FIG. 1 is an electronmicrograph indicating mainly a section around a gas passage (in the catalyst) through which exhaust gas to be purified is to flow. The gas passage was formed inside each cell of the monolithic substrate. FIG. 1B is an enlarged electronmicrograph indicating a part of the section of FIG. 1.

As depicted in Table 1 and FIGS. 1A and 1B, the inner coat layer was formed of the particle materials which were so fine as to have the average particle size of 2.1 μm and was so thick as to have the thickness of 133 μm. Consequently, production of many cracks due to shrinkage during drying and firing had been observed. The outer coat layer was formed of the particle materials having the average particle size of 4.6 μm and had the thickness of 43 μm, serving as a crack-preventing coat layer which had no crack. It had been confirmed that the materials of the outer layer were filled in the cracks of the inner coat layer thereby reinforcing the inner or catalytic coat layer.

Example 2

A catalyst of Example 2 was obtained in a similar manner to that of Example 1 with the exception that the inner and outer coat layers were formed respectively thinner than those in Example 1.

Figure 2:
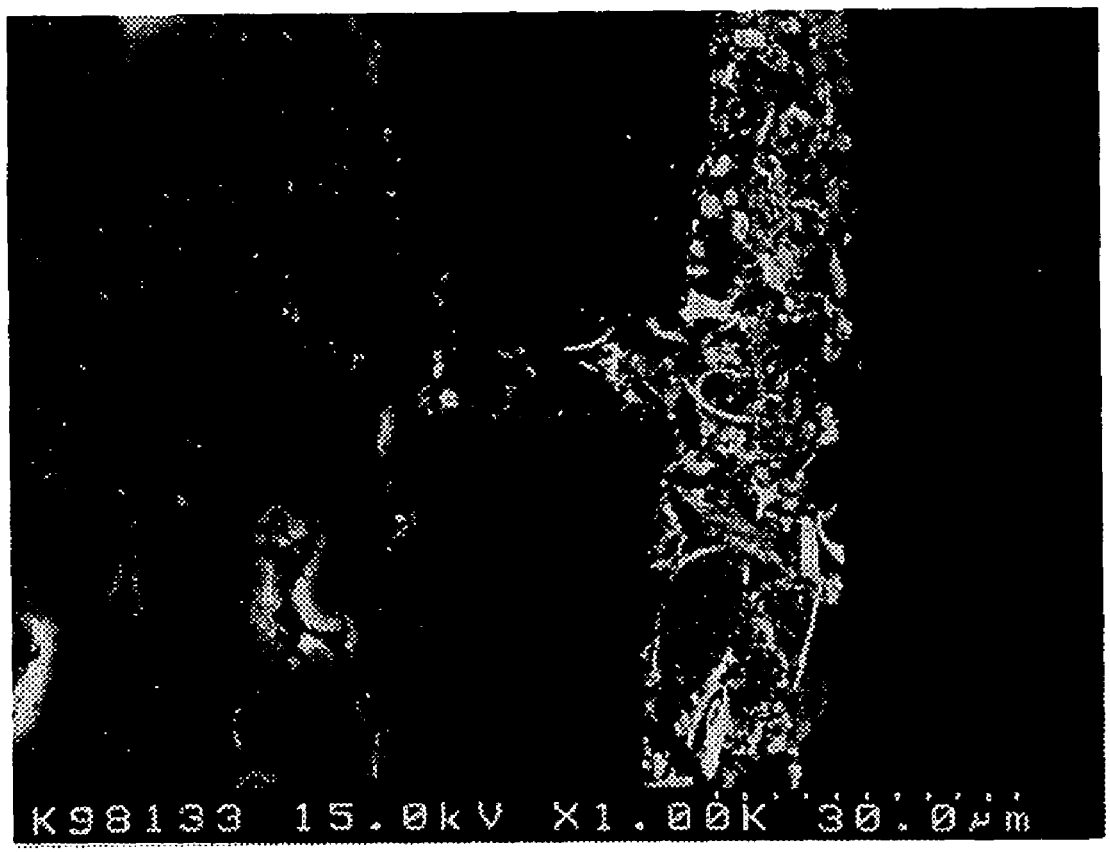
FIG. 2 is an electronmicrograph obtained by a SEM, of a section of another example (Example 2) of the exhaust gas purifying catalyst according to the present invention.

Results of measurement and observation of the catalyst of Example 2, including the thickness of the inner and outer coat layers and the presence or absence of crack in the catalyst are shown in Table 1. Additionally, FIG. 2 shows observation results (an electronmicrograph at 1000 magnifications) of the cross-sectional surface of the catalyst of Example 1. FIG. 2 is an electronmicrograph indicating mainly a section between adjacent two gas passages in the catalyst.

As depicted in Table 1 and FIG. 2, the inner coat layer was so thin as to have a thickness of 25 μm; however, it was formed of the particle materials which were so fine as to have the average particle size of 2.1 μm. Consequently, production of cracks due to shrinkage had been observed. The outer coat layer was formed of the particle materials having the average particle size of 4.6 μm and had the thickness of 18 μm, serving as a crack-preventing coat layer which had no crack. It had been confirmed that the materials of the outer layer reinforced the inner or catalytic coat layer.

Comparative Example 1

A catalyst of Comparative Example 1 was obtained in a similar manner to that of Example 1 with the exception that the amount of water contained in the slurries was decreased by about 20% by weight while the inner and outer coat layers were formed respectively thicker than those in Example 1 so that the weights of the inner and outer coat layers were respectively 250 g and 120 g per liter of the monolithic substrate.

Figure 3A:
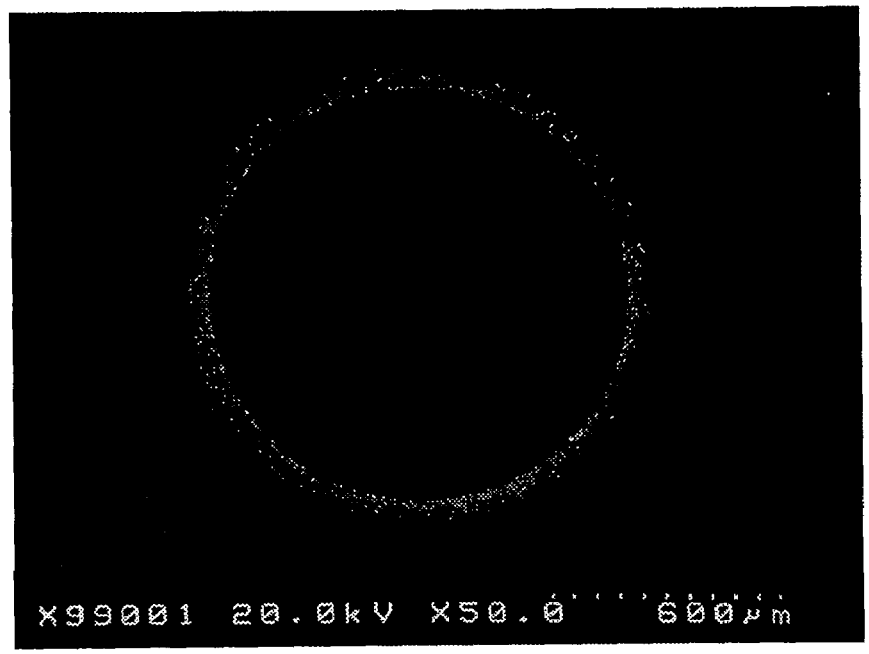
FIG. 3A is an electronmicrograph obtained by a SEM, of a section of a reference example (Comparative Example 1) of an exhaust gas purifying catalyst outside the scope of the present invention.
Figure 3B:
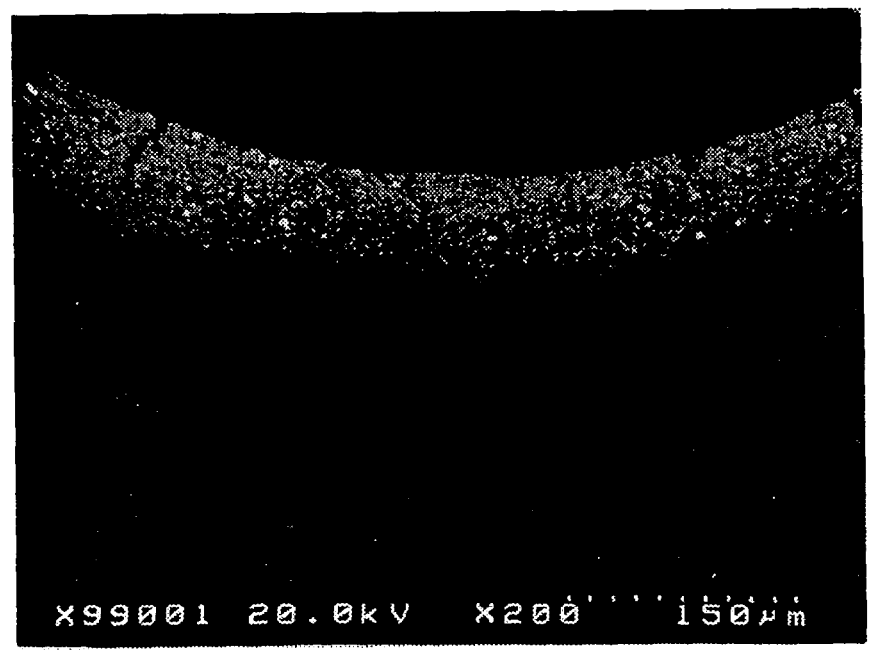
FIG. 3B is an enlarged electronmicrograph depicting a part of the section of FIG. 3A.

Results of measurement and observation of the catalyst of Comparative Example 1, including the thickness of the inner and outer coat layers and the presence or absence of crack in the catalyst are shown in Table 1. Additionally, FIGS. 3A and 3B show observation results (electronmicrographs at 50 and 200 magnifications) of the coat layers of the catalyst of Comparative Example 1. FIG. 3A is an electronmicrograph indicating mainly a section around a gas passage through which exhaust gas is to flow. FIG. 3B is an enlarged electronmicrograph indicating a part of the section of FIG. 3A.

As depicted in Table 1 and FIGS. 3A and 3B, the inner coat layer was formed of the particle materials which were so fine as to have the average particle size of 2.1 μm and was so thick as to have the thickness of 150 μm. Consequently, production of many cracks due to shrinkage during drying and firing had been observed as in Example 1. While the outer coat layer was formed of the particle materials having the average particle size of 4.6 μm, it was so thick as to have the thickness of 75 μm. Consequently, shrinkage during drying and firing became remarkable, and therefore production of cracks was observed.

TABLE 1

| | Inner coat layer | | | Outer coat layer | | |
|---|---|---|---|---|---|---|
| Sample | Average particle size (μm) | Thickness (μm) | Cracks | Average particle size (μm) | Thickness (μm) | Cracks |
| Example 1 | 2.1 | 133 | Present | 4.6 | 43 | Absent |
| 2 | 2.1 | 25 | Present | 4.6 | 18 | Absent |
| Comparative Example | 2.1 | 150 | Present | 4.6 | 75 | Present |

Example 3

First, 550 g of a compound consisting of 98% by weight of activated alumina and 2% by weight of ceria was impregnated with 415 ml of an amine aqueous solution containing 8.2 g of platinum in the form of $H_2Pt(OH)_6$ so as to form a compound solid. Subsequently, this compound solid was impregnated with an aqueous solution of glacial acetic acid (prepared by diluting 33 ml of glacial acetic acid with 50 ml of water), followed by drying at 150° C. for 3 hours and firing at 400° C. for 2 hours, thus obtaining catalytic powder. This catalytic powder in an amount of 500 g was mixed with 1250 g of water to form a slurry. This slurry was pulverized by a ball mill so that the particle materials in the slurry had particle sizes of not larger than 9 μm.

The slurry was coated or impressed on a cordierite ceramic honeycomb-type monolithic substrate having a volume of 1.3 liters, about 62 (axially extending) cells per cm$^2$, an elliptic cross-section, a cross-sectional area of 113 cm$^2$ and a length of 115 mm, so that thin walls of cells were coated with the slurry. Thereafter, the coated monolithic substrate was blown with air stream to remove excessive slurry in the cells, and then dried 120° C. and fired at 400° C. for 1 hour. As a result, a catalyst of Example 3 was prepared in which a catalytic coat layer was formed on the wall of the cells of the monolithic substrate. The weight of the catalytic coat layer was 100 g per one liter of the monolithic substrate.

The above slurry coated on the monolithic substrate was subjected to a centrifugal separation to obtain a supernatant liquid. Then, the supernatant liquid was subjected to an analysis for ion concentration or content. As a result, the supernatant liquid had an ion concentration of 5 ppm of Na, 5 ppm of Ca and 10 ppm of Cl.

Figure 4:
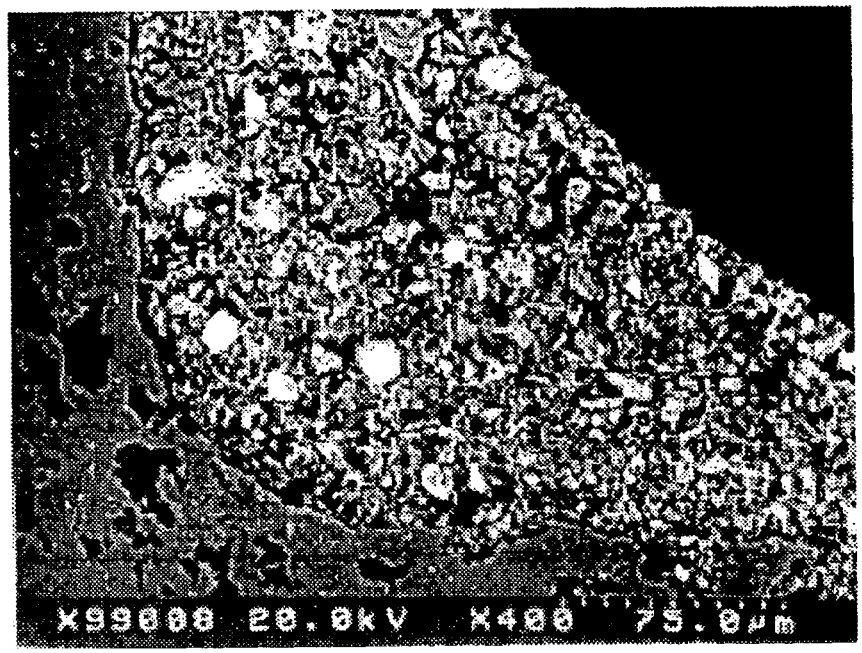
FIG. 4 is an electronmicrograph obtained by a SEM, of a section of a further example (Example 3) of the exhaust gas purifying catalyst according to the present invention.

In order to investigate cracks in the catalyst, the catalyst was dipped in a liquid state epoxy resin. After the epoxy resin was solidified, the catalyst was cut to expose the cross-sectional or cut surface which was observed by a scanning electron microscope, providing an electronmicrograph (at 400 magnifications) shown in FIG. 4 which depicts a section around a gas passage of the catalyst. As a result of this observation, no production of crack was confirmed.

Example 4

Activated alumina in an amount of 500 g and 120 g of lanthanum carbonate were cast into 645 g of a 6.5% aluminum nitrate aqueous solution, followed by stirring and mixing, so as to form a mixture. The mixture was dried at 150° C. for 12 hours, and then fired at 700° C. for 2 hours, thereby obtaining mixture powder. Water in an amount of 1250 g was added to this mixture powder, followed by pulverizing in a ball mill, thus obtaining a slurry to be coated.

The slurry was coated or impressed on a cordierite ceramic honeycomb-type monolithic substrate having a volume of 1.3 liters, about 62 (axially extending) cells per cm$^2$, an elliptic cross-section, a cross-sectional area of 113 cm$^2$ and a length of 115 mm, so that thin walls of cells were coated with the slurry. Thereafter, the coated monolithic substrate was blown with air stream to remove excessive slurry in the cells, and then dried 120° C. and fired at 400° C. for 1 hour. As a result, a catalyst of Example 4 was prepared in which a catalytic coat layer was formed on the wall of the cells of the monolithic substrate. The weight of the catalytic coat layer was 100 g per one liter of the monolithic substrate.

The above slurry coated on the monolithic substrate was subjected to a centrifugal separation to obtain a supernatant liquid. Then, the supernatant liquid was subjected to an analysis for ion concentration or content. As a result, the supernatant liquid had an ion concentration or content of 45 ppm of $NO_3$, 10 ppm of Cl, 5 ppm of Na, and 5 ppm of Ca.

Figure 5:
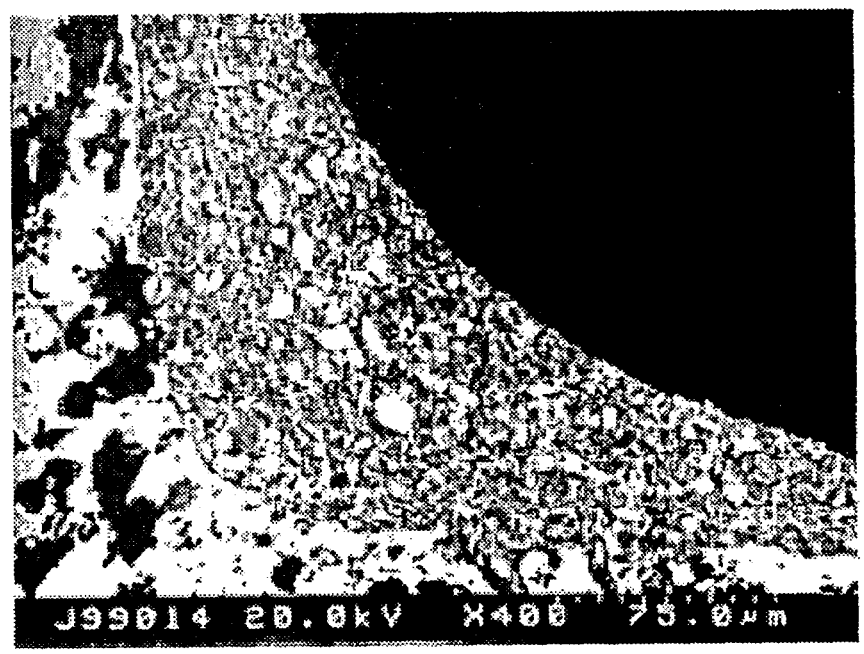
FIG. 5 is an electronmicrograph obtained by a SEM, of a section of a further example (Example 4) of the exhaust gas purifying catalyst according to the present invention.

In order to investigate cracks in the catalyst, the catalyst was dipped in a liquid state epoxy resin. After the epoxy resin was solidified, the catalyst was cut to expose the cross-sectional or cut surface which was observed by a scanning electron microscope, providing an electronmicrograph (at 400 magnifications) shown in FIG. 5 which depicts a section around a gas passage in the catalyst. As a result of this observation, no production of crack was confirmed.

Example 5

First, 500 g of activated alumina powder was impregnated with a nitric acid solution of dinitrodiammine platinum, followed by drying and firing, so as to form catalytic alumina powder carrying 3% by weight of Pd. Then, water in an amount of 1250 g was added to 500 g of this catalytic alumina powder, followed by pulverizing in a ball mill, thereby preparing a slurry to be coated.

This slurry was coated or impressed on a metallic honeycomb-type monolithic substrate having a volume of 1.3 liters, about 62 (axially extending) cells per cm$^2$, an elliptic cross-section, a cross-sectional area of 113 cm$^2$ and a length of 115 mm, so that thin walls of cells were coated with the slurry. Thereafter, the coated monolithic substrate was blown with air stream to remove excessive slurry in the cells, and then dried 130° C. and fired at 400° C. for 1 hour. As a result, a catalyst of Example 5 was prepared in which a catalytic coat layer was formed on the wall of the cells of the monolithic substrate. The weight of the catalytic coat layer was 150 g per one liter of the monolithic substrate.

The above slurry coated on the monolithic substrate was subjected to a centrifugal separation to obtain a supernatant liquid. Then, the supernatant liquid was subjected to an analysis for ion concentration or content. As a result, the supernatant liquid had an ion concentration or content of 200 ppm of $NO_3$, 7 ppm of Cl, 3 ppm of Na and 8 ppm of Ca.

Figure 6:
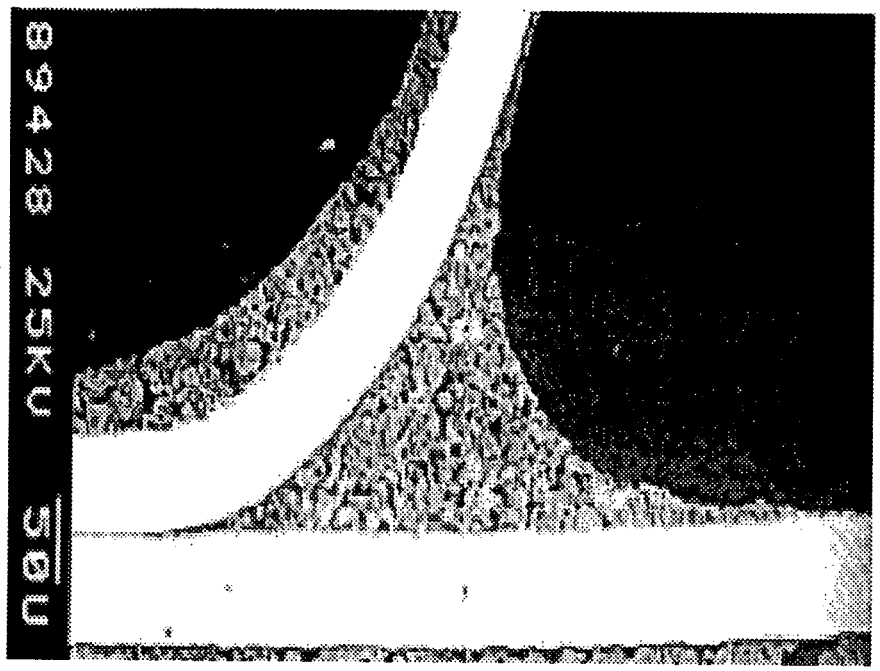
FIG. 6 is an electronmicrograph obtained by a SEM, of a section of a further example (Example 5) of the exhaust gas purifying catalyst according to the present invention.

In order to investigate cracks in the catalyst, the catalyst was dipped in a liquid state epoxy resin. After the epoxy resin was solidified, the catalyst was cut to expose the cross-sectional or cut surface which was observed by a scanning electron microscope, providing an electronmicrograph (at 200 magnifications) shown in FIG. 6 which depicts a section between two adjacent gas passages in the catalyst. As a result of this observation, no production of crack was confirmed.

Comparative Example 2

First, 550 g of a compound consisting of 98% by weight of activated alumina and 2% by weight of ceria was impregnated with 415 ml of an amine aqueous solution containing 8.2 g of platinum in the form of $H_2Pt(OH)_6$ so as to form a compound solid. Subsequently, this compound solid was impregnated with an aqueous solution of glacial acetic acid (prepared by diluting 33 ml of glacial acetic acid with 50 ml of water), followed by addition of 85 ml of water, thus forming a slurry. This slurry was pulverized by a ball mill so as to contain particle materials having particle sizes of not larger than 9 μm.

This slurry was coated or impressed on a cordierite ceramic honeycomb-type monolithic substrate having a volume of 1.3 liters, about 62 (axially extending) cells per cm$^2$, an elliptic cross-section, a cross-sectional area of 113 cm$^2$ and a length of 115 mm, so that thin walls of cells were coated with the slurry. Thereafter, the coated monolithic substrate was blown with air stream to remove excessive slurry in the cells, and then dried 120° C. and fired at 400° C. for 1 hour. As a result, a catalyst of this comparative example was prepared in which a catalytic coat layer was formed on the wall of the cells of the monolithic substrate. The weight of the catalytic coat layer was 100 g per one liter of the monolithic substrate.

The above slurry coated on the monolithic substrate was subjected to a centrifugal separation to obtain a supernatant liquid. Then, the supernatant liquid was subjected to an analysis for ion concentration or content. As a result, the supernatant liquid had an acetic acid ion concentration of 35000 ppm.

Figure 7:
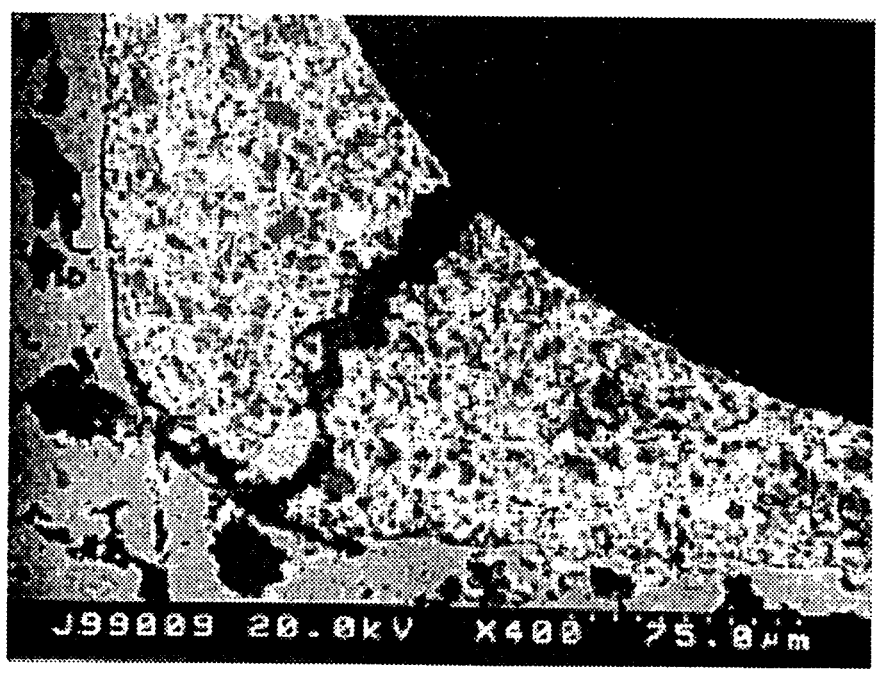
FIG. 7 is an electronmicrograph obtained by a SEM, of a section of another reference example (Comparative Example 2) of the exhaust gas purifying catalyst outside the scope of the present invention.

In order to investigate cracks in the catalyst, the catalyst was dipped in a liquid state epoxy resin. After the epoxy resin was solidified, the catalyst was cut to expose the cross-sectional or cut surface which was observed by a scanning electron microscope, providing an electronmicrograph (at 400 magnifications) shown in FIG. 7 which depicts a section around a gas passage in the catalyst. As a result of this observation, production of cracks in the catalytic coat layer was confirmed.

Comparative Example 3

Activated alumina in an amount of 500 g and 120 g of lanthanum carbonate were cast into 645 g of a 6.5% aluminum nitrate aqueous solution, followed by stirring and mixing, so as to form a mixture. The mixture was pulverized by a ball mill thereby obtaining a slurry to be coated.

This slurry was coated or impressed on a cordierite ceramic honeycomb-type monolithic substrate having a volume of 1.3 liters, about 62 (axially extending) cells per cm$^2$, an elliptic cross-section, a cross-sectional area of 113 cm$^2$ and a length of 115 mm, so that thin walls of cells were coated with the slurry. Thereafter, the coated monolithic substrate was blown with air stream to remove excessive slurry in the cells, and then dried 120° C. and fired at 700° C. for 2 hour. As a result, a catalyst of this comparative example was prepared in which a catalytic coat layer was formed on the wall of the cells of the monolithic substrate. The weight of the catalytic coat layer was 100 g per one liter of the monolithic substrate.

The above slurry coated on the monolithic substrate was subjected to a centrifugal separation to obtain a supernatant liquid. Then, the supernatant liquid was subjected to an analysis for ion concentration. As a result, the supernatant liquid had a nitric acid ion concentration or content of 44000 ppm.

Figure 8:
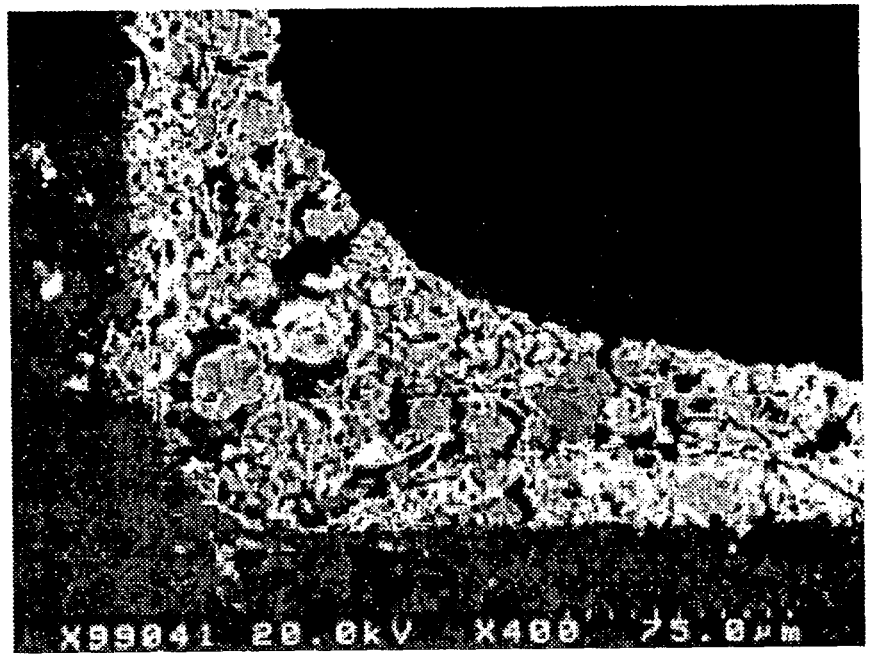
FIG. 8 is an electronmicrograph obtained by a SEM, of a section of a further reference example (Comparative Example 3) of the exhaust gas purifying catalyst outside the scope of the present invention.

In order to investigate cracks in the catalyst, the catalyst was dipped in a liquid state epoxy resin. After the epoxy resin was solidified, the catalyst was cut to expose the cross-sectional or cut surface which was observed by a scanning electron microscope, providing an electronmicrograph (at 400 magnifications) shown in FIG. 8 which depicts a section around a gas passage in the catalyst. As a result of this observation, production of cracks in the catalytic coat layer was confirmed.

Comparative Example 4

First, 500 g of activated alumina powder was impregnated with a nitric acid solution of dinitrodiammine platinum, followed by drying and firing, so as to form catalytic alumina powder carrying 3% by weight of Pd. Then, 14 g of nitric acid and 1236 g of water were added to 500 g of this catalytic alumina powder, followed by pulverizing in a ball mill thereby preparing a slurry to be coated.

This slurry was coated or impressed on a metallic honeycomb-type monolithic substrate having a volume of 1.3 liters, about 62 (axially extending) cells per $cm^2$, an elliptic cross-section, a cross-sectional area of 113 $cm^2$ and a length of 115 mm, so that thin walls of cells were coated with the slurry. Thereafter, the coated monolithic substrate was blown with air stream to remove excessive slurry in the cells, and then dried 130° C. and fired at 400° C. for 1 hour. As a result, a catalyst was prepared in which a catalytic coat layer was formed on the wall of the cells of the monolithic substrate. The weight of the catalytic coat layer was 150 g per one liter of the monolithic substrate.

The above slurry coated on the monolithic substrate was subjected to a centrifugal separation to obtain a supernatant liquid. Then, the supernatant liquid was subjected to an analysis for ion concentration or content. As a result, the supernatant liquid had a nitric acid ion concentration of 5800 ppm.

Figure 9:
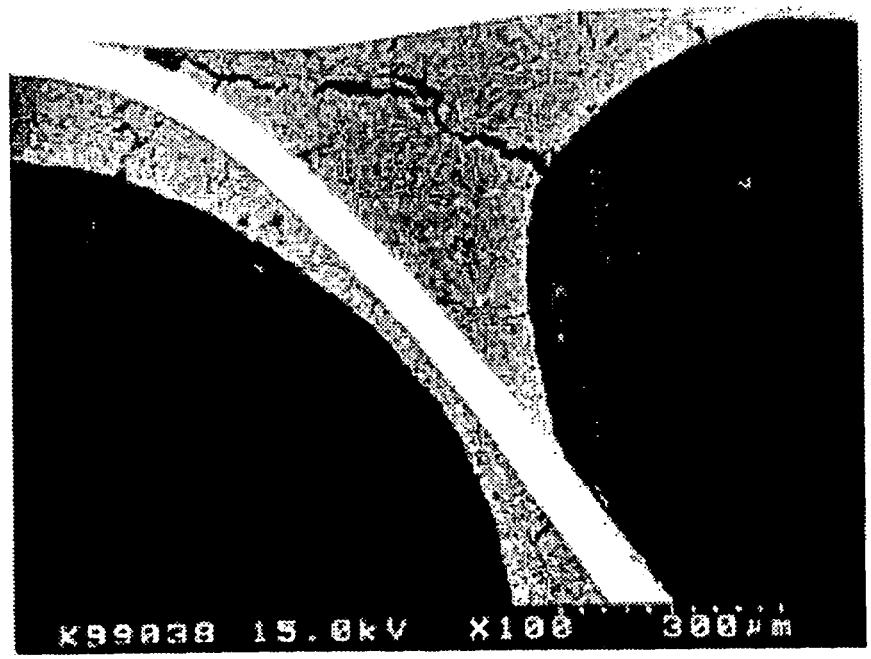
FIG. 9 is an electronmicrograph obtained by a SEM, of a section of a further reference example (Comparative Example 4) of the exhaust gas purifying catalyst outside the scope of the present invention.

In order to investigate cracks in the catalyst, the catalyst was dipped in a liquid state epoxy resin. After the epoxy resin was solidified, the catalyst was cut to expose the cross-sectional or cut surface which was observed by a scanning electron microscope, providing an electronmicrograph (at 100 magnifications) shown in FIG. 9 which depicts a section between two gas passages in the catalyst. As a result of this observation, production of cracks in the catalytic coat layer was confirmed.

The entire contents of Japanese Patent Applications P2000-050993 (filed Feb. 28, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method of producing an exhaust gas purifying catalyst, comprising:
   coating a substrate with a first slurry containing a catalytic component;
   drying and firing the first slurry on said substrate to form an inner catalytic coat layer on said substrate;
   coating a second slurry containing a catalytic component, on an upper-most surface of said inner catalytic coat layer, particle materials contained in said second slurry having an average particle size ranging from 4.6 to 7 µm; and
   drying and firing the second slurry on the inner catalytic coat layer to form an upper-most catalytic coat layer having a thickness of not larger than 50 µm, the upper-most catalytic coat layer serving as a crack-preventing coat layer.

2. A method as claimed in claim 1, wherein said second slurry contains alumina.

3. A method as claimed in claim 1, wherein said second slurry contains a porous substance.

4. A method of producing an exhaust gas purifying catalyst, comprising:
   preparing a slurry including a catalyst component and water which contains anions other than $OH^{31}$ in a content of not larger than 50 ppm and cations other than $H^+$ in a content of not larger than 50 ppm;
   coating a substrate with the slurry; and
   drying and firing the slurry on said substrate to form a catalytic coat layer on said substrate.

5. A method of producing an exhaust gas purifying catalyst, comprising:
   coating a substrate with a first slurry containing a catalytic component;
   drying and firing the first slurry on said substrate to form an inner catalytic coat layer on said substrate;
   coating a second slurry containing a catalytic component, on the-inner catalytic coat layer, particle materials contained in said second slurry having an average particle size ranging from 4.6 to 7 µm, said second slurry containing ions other than hydrogen ions and hydroxide ions, in a content of not larger than 50 ppm; and
   drying and firing the second slurry on the inner catalytic coat layer to form an upper-most catalytic coat layer having a thickness of not larger than 50 µm, the upper-most catalytic coat layer serving as a crack-preventing coat layer.

* * * * *